Sept. 26, 1933.  H. PULVER  1,927,992

COORDINATOGRAPH

Filed Dec. 10, 1932

Patented Sept. 26, 1933

1,927,992

UNITED STATES PATENT OFFICE 1,927,992

COORDINATOGRAPH

Hans Pulver, Biel, Switzerland, assignor to Oswald Coradi, Zurich, Switzerland

Application December 10, 1932, Serial No. 646,652, and in Switzerland December 17, 1931

1 Claim. (Cl. 33—189)

The present invention relates to improvements in co-ordinatographs and more especially to polar-co-ordinatographs. The object of the invention is to provide a co-ordinatograph which can be used as a polar co-ordinatograph and as a device by means of which orthogonal co-ordinates may be measured or marked off.

I attain this object by providing the angle measuring carriage of a polar co-ordinatograph of any known construction with a pricker carriage adapted to be adjusted in two directions at right angles to each other, while its carrier may be set in any angular position.

In the drawing a preferred mode of construction is shown by way of an example in a diagrammatical manner.

Figure 1:
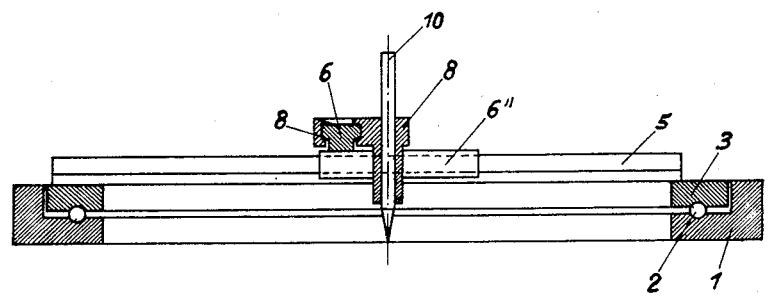
Fig. 1 is a vertical central sectional view of a polar co-ordinatograph, constructed and arranged in accordance with my invention.
Figure 2:
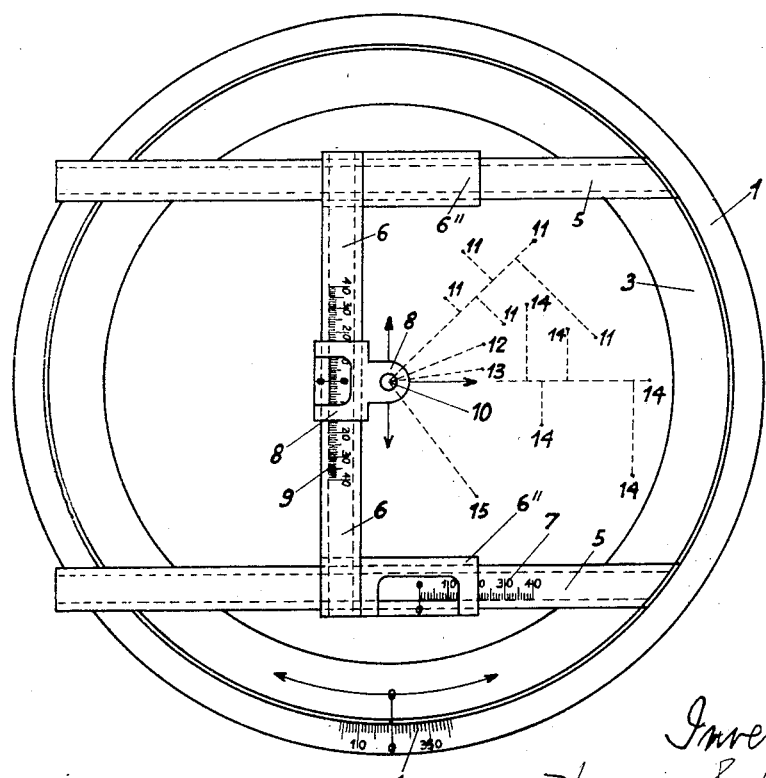
Fig. 2 is a plan of the same.

In the drawing 1 denotes a base ring; 3 an angle measuring carriage supported and running on balls 3 of the base 1. The latter is provided with graduated circular scale 4, of which only a part is shown in Fig. 2. The carriage 3 is provided with two guide rails 5 running parallel to each other and rigidly connected to said carriage 3. On the guide rails 5 a measuring carriage 6 is slidably mounted. The bar 6' interconnecting the sleeves 6'' of said carriage 6 forms a guide for a measuring carriage 8. The pricker 10 is mounted in the carriage 8 in the well known manner. On one of the bars 5 a graduated scale 7 and on the bar 6' a scale 9 is marked off. 11 to 15 denote points which may be marked on the drawing in one and the same position of the carriage 3.

By using the device as an orthogonal co-ordinatograph the carriage 3 is turned to the proper position on the base 1, the position may be read on the scale 4 by means of an index. The carriage 3 is locked by some well known means now in general use in polar co-ordinatographs. By displacing the carriage 6 on the rails 5 an abscissa 11 or 14 according to the angular position of the carriage 3 may be measured and by moving the carriage 8 on the bar 6 ordinates are measured, use being made of the scales 7 and 9.

The carriages 6 and 8 are placed to zero position and to bring thereby the pricker 10 to the center when the device is to be used to measure polar co-ordinatographs 10, 12, 15.

What I wish to secure by U. S. Letters Patent is:

A polar co-ordinatograph comprising a base, an angle measuring carriage rotatably mounted in said base, two parallel guides on said rotary carriage, a carriage including sleeves slidably mounted on said guides respectively, a guide bar carried by said sleeves and running at a right angle to said guides, a carriage slidably mounted on said guide bar, a pricker on last said carriage, a scale for each of said carriages.

HANS PULVER.